UNITED STATES PATENT OFFICE.

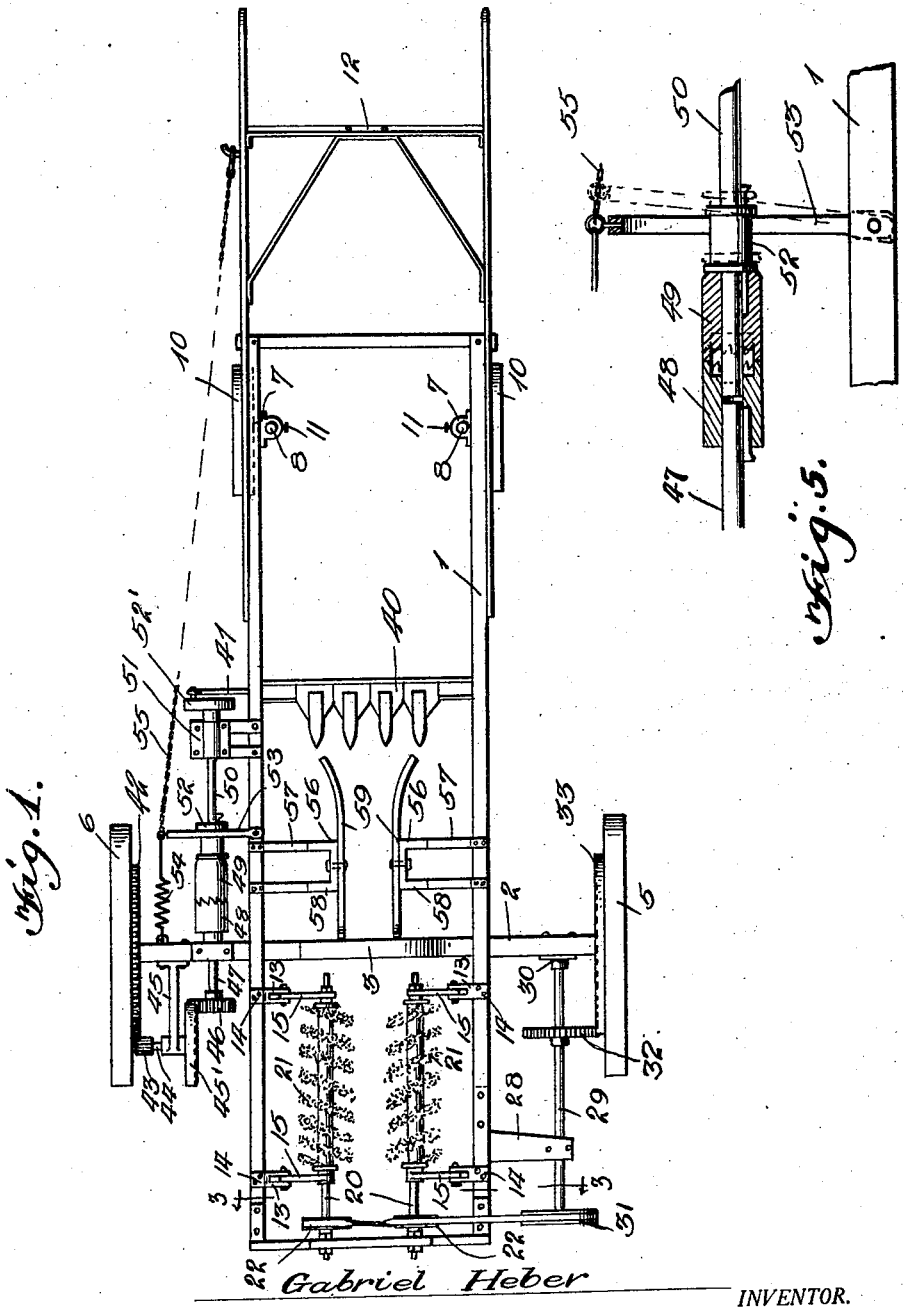

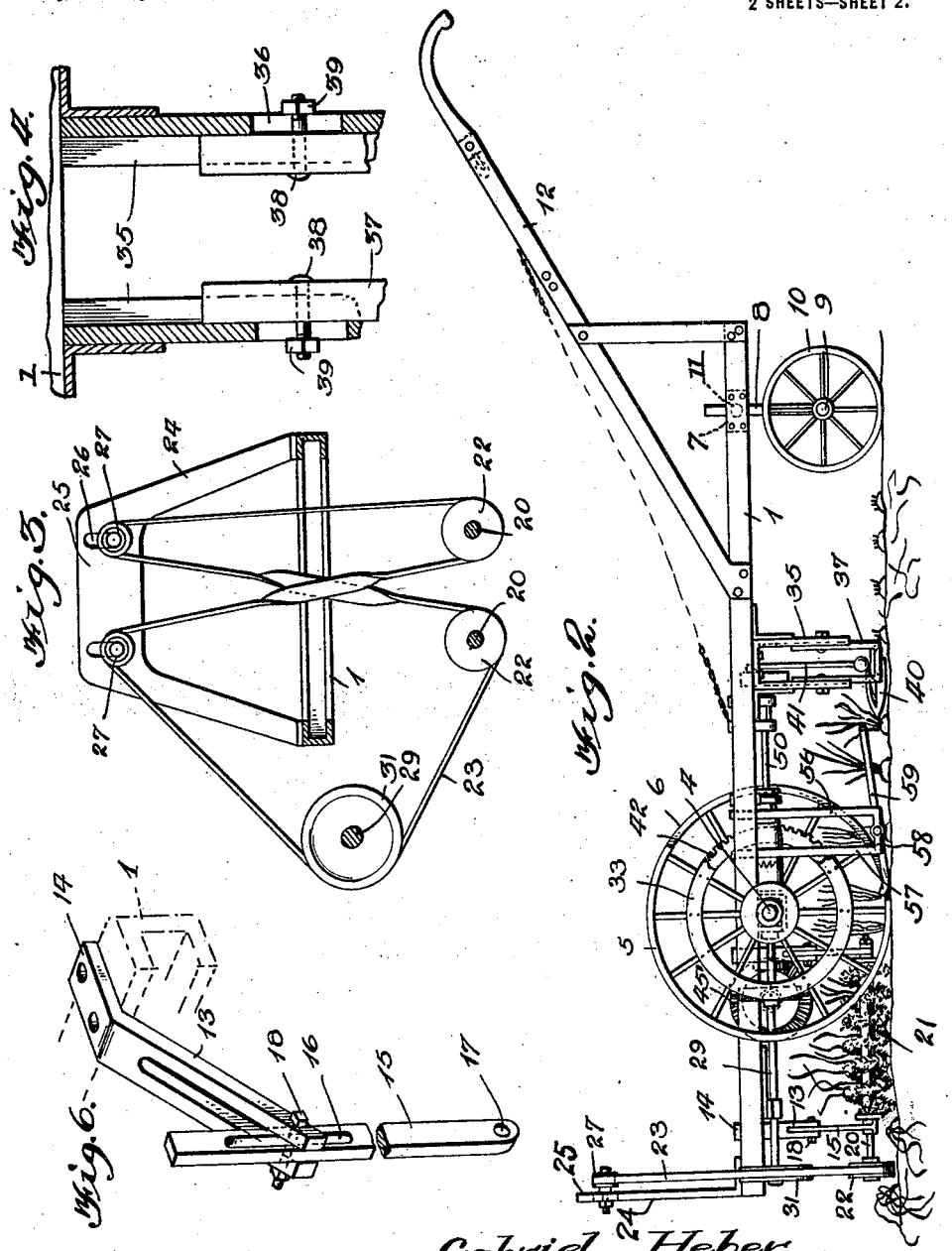

GABRIEL HEBER, OF ROCK ISLAND, ILLINOIS.

ONION-TOPPING MACHINE.

1,413,224.  Specification of Letters Patent.  Patented Apr. 18, 1922.

Application filed June 2, 1920. Serial No. 385,966.

*To all whom it may concern:*

Be it known that I, GABRIEL HEBER, a citizen of the United States, residing at Rock Island, in the county of Rock Island and State of Illinois, have invented certain new and useful Improvements in an Onion-Topping Machine, of which the following is a specification.

This invention relates to improvements in that class of agricultural implements known as onion topping machines and is designed especially with a view to providing an implement for cutting the tops of growing onions or other similar vegetables and plants.

The essential objects of the invention are to provide certain features of machinery of this type whereby the onion tops may be formed to a vertical position for engaging the cutting means.

Another object of the invention is to provide a pair of brushes for sweeping the onion tops which have drooped and are lying upon the ground into a vertical position and to retain same in this position as the machine moves forwardly and also to pass same over or along to a guide so that same will be retained in a vertical position when they come into contact with the cutting means.

Another object of the invention is to provide simple and efficient means whereby the brushes may be adjusted with relation to the ground and with relation to each other.

Another object of the invention is to provide simple and efficient means for attaching the cutting means to the frame so that same may be adjusted vertically.

A still further object of the invention is to generally improve upon onion topping machines of this character by providing a device which will be extremely durable and inexpensive in construction, one which is efficient and reliable in operation and well adapted to the purpose for which it is designed.

With these and numerous other objects in view, the invention resides in certain novel features of construction, combination and arrangement of parts as will be hereinafter fully described and claimed.

In the drawings:—

Figure 1 is a top plan view of my device.

Figure 2 is a side elevation thereof.

Figure 3 is a section taken on the line 3—3 of Figure 1 looking in the directon of the arrows.

Figure 4 is a detailed sectional view of the means provided for supporting the cutting means.

Figure 5 is a sectional view taken through the clutch means used for actuating the cutting means, and Figure 6 is a detailed perspective view of the bracket used to support the brushes.

In the preferred embodiment of my invention it will be seen that 1 designates the rectangular frame which is provided with the cross beam 2 which is curved intermediate its ends so as to provide the upwardly extending arcuate portion 3 and has provided at its ends the stub axles 4 for receiving the driving wheels 5 and 6. The cross beam 2 is situated adjacent the forward end of the machine. Adjacent the rear end of the frame I have provided the sleeves 7 into which extend the standards 8 having the stub axles 9 for rotatably carrying the wheels 10. In order that this rear end of the frame 1 may be raised or lowered I have provided the sleeves 7 with the set screw 11 thus allowing the vertical adjustment of the standards 8. Extending rearwardly from the frame 1 I have provided a handle mechanism 12 which will be of conventional form similar to that used upon an ordinary hand plow.

The frame 1 is constructed of U-shaped angle iron and at its forward end is provided with the depending bracket 13 having the plate portions 14 which are fixedly attached to the frame and the depending portion is bifurcated so as to receive the rods 15. These rods 15 are provided with the elongated slot 16 adjacent their upper ends and the apertures 17 at their lower terminals. A bolt 18 passes through the terminals of the bifurcated portion of the depending bracket 13 and passes through the elongated slot 16 of the rod 15 as is clearly shown in Figure 6 of the drawing. From this construction it will be seen that the rod 15 may be adjusted vertically and may also be disposed at any desired angle in relation to the depending portion 13 of the bracket. The shafts 20 are rotatably carried within the apertures 17 and of course any suitable bearing may be carried therein. These shafts carry the brushes 21 which are formed so as to be spiral and have bristles which are a little stiffer than those ordinarily formed upon a paint brush. The shafts 20 are provided with the pulley wheels 22 which are grooved for receiving the belt 23. It will be understood that these pulley wheels 22 are keyed to shafts 20 so as to rotate therewith. By referring especially to Figure 3 of the drawings it will be seen that the forward end of the frame 1 is provided with an arched portion 24 having its upper cross piece 25 provided with a pair of elongated vertical slots 26 for receiving the pulley wheels 27 so that same may be adjusted vertically if so desired for regulating the tautness of the belt 23. A bracket 28 extends from one side of the frame 1 so as to support the shaft 29 which is also supported by the cross beam 2 by means of the journal 30. At the free end of the shaft 29 there is provided the enlarged pulley wheel 31 over which passes the belt 23. A gear wheel 32 is keyed to the shaft 29 intermediate its ends and so as to mesh with the crown gear 33 fixedly attached to the driving wheel 5. By referring especially to Figure 3 of the drawings it will be seen that the driving belt 23 passes over the driving pulley 31 and over the idler pulley 27 to the left and then under the brush pulley 22 to the right and then over the idler pulley 27 to the right and then down under the brush pulley 22 to the left and continues around the driving pulley 31. It should be understood that this belt 23 may be of any preferred construction and that the idler wheel may be mounted in any preferred manner within the slots 26 so as to regulate the tautness of this belt 23.

From the construction just described it will be seen that as the machine moves forwardly the drive wheel 5 will actuate the crown gear 33 so as to rotate the gear 32 thus actuating the shaft 29 which will in turn rotate the pulley wheel 31 thus driving the belt 23 for rotating the brush pulley wheels 22 for actuating the brushes 21. Thus the onions which are lying along the ground such as is indicated in Figure 2 of the drawing will be swept up and forced to a vertical position and because of the spiral arrangement of the bristles the forward movement of the machine will allow these onion tops to remain in a vertical position. It will also be seen that because of the construction shown in detail in Figure 6 these brushes may be placed as close to the ground as desired and as close to each other as may be desired.

Intermediate the ends of the frame I have provided the depending arms 35 which may be attached to the frame in any suitable manner and are substantially U-shaped in cross section and are provided with the elongated slots 36 as shown clearly in Figure 4 of the drawings. The U-shaped bracket 37 has its arms slidably mounted within the U-shaped portion of the arms 35 and carries the bolts 38 which pass through the slots 36 so as to be slidable therein and thus the U-shaped bracket 37 may be held in vertical adjustment by means of the nuts 39. The U-shaped bracket 37 carries the reciprocating cutter 40 which may be of any preferred construction and is actuated by means of the reciprocating rod 41. The drive wheel 6 is provided with a gear wheel fixedly carried thereby and indicated by the numeral 42. This gear wheel 42 meshes with the relatively small gear 43 which is carried by one end of the shaft 44. A bracket 45 is carried by the cross beam 2 so as to support this shaft 44. At the other end of the shaft 44 there is situated the crown gear 45′ which meshes with the gear 46. This gear 46 is keyed to the shaft 47 which is carried by the cross beam 2. By referring especially to Figure 5 of the drawings it will be seen that a clutch segment 48 is keyed to the shaft 47 and actuates the complementary clutch segment 49 which is slidable on and keyed to the shaft 50 which is rotatably carried by the block 51 and is provided at its terminal with the crank wheel 52′ to which is attached the reciprocating rod 41. Thus the rotation of the drive wheel 6 will actuate the reciprocating cutting means 40. As stated the complementary clutch segment 49 is slidable on the shaft 50 and this segment is provided with the collar 52 which is engaged by the forked lever 53 which is normally held by the tension spring 54 so as to hold the clutch segments in engagement with each other. A chain 55 is attached to the lever 53 so that these segments may be disengaged from each other when the operator so desires as it will be seen that this chain extends rearwardly to the handle mechanism 12.

Between the brushes 21 and the reciprocating means 40 I have provided the brackets indicated generally by the numeral 56 which are attached at their upper ends to the frame 1 and are provided with the depending portions 57 and the horizontal portions 58 and are attached to the runner 59. By referring especially to Figure 2 of the drawings it will be seen that the runners 59 have their forward ends adjacent the ground and extend at an acute angle upwardly therefrom toward the reciprocating cutting means 40.

This machine is adapted to be made of very light material so that one man may push same but of course any draft means may be used. As the machine is pushed forwardly the brushes 21 will be actuated so as to sweep the drooping tops of the onions into a vertical position and to deliver same to the guides 59 which in turn will deliver the onions to the reciprocating cutter 40 which I prefer to situate immediately below the rear terminals of the guides 59. Of course when it is desired not to use the reciprocating cutter the chain 55 may be pulled thus stopping the operation thereof in the manner described.

From the foregoing description, taken in connection with the accompanying drawings, the construction and operation of the device will be readily understood without a more extended explanation. As numerous changes in form, proportion, and in the minor details of construction may be resorted to without departing from the spirit of this invention, I do not wish to be limited to the construction herein shown and described other than is claimed.

Having thus described my invention what I claim as new is:—

1. The combination in a device of the class described, of a frame, supporting wheels, a pair of parallel brushes having their bristles spirally arranged, a plurality of depending brackets fixedly attached to said frame and provided with a bifurcated portion, a rod having an elongated slot disposed in said bifurcated portion of said bracket, a bolt passing through said bifurcated portion and said slot, said brushes being carried by said rods whereby they will be laterally and vertically adjustable.

2. The combination in a device of the class described, of a pair of parallelly disposed rotary brushes adjustably carried by a frame, an arched portion carried by the forward end of said frame, a pair of idler pulleys adjustably carried by the upper portion of said arched portion, an operating pulley carried by said frame, means for actuating said operating pulley, pulleys carried by the shafts of said rotary brushes, a belt passing over all of said pulleys, and cutting means carried by the frame.

3. The combination in a device of the class described, of a frame, a pair of rotary spiral brushes carried by said frame, means for vertically and laterally adjusting the brushes in respect to the frame, guide means carried by said frame in rear of said brushes, and cutting means carried in rear of said guide means by said frame.

In testimony whereof I affix my signature in presence of two witnesses.

GABRIEL HEBER.

Witnesses:
F. H. HARRIS,
C. A. BRANDENBURG.